(12) United States Patent
Gao (10) Patent No.: US 10,629,156 B2
(45) Date of Patent: Apr. 21, 2020

(54) CONTROL CIRCUIT FOR LCD PANEL AND LCD PANEL

(71) Applicant: SHENZHEN CHINA STAR OPTOELECTRONICS TECHNOLOGY CO., LTD., Shenzhen, Guangdong (CN)

(72) Inventor: Xiang Gao, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/219,239

(22) Filed: Dec. 13, 2018

(65) Prior Publication Data

US 2020/0005725 A1 Jan. 2, 2020

Related U.S. Application Data

(63) Continuation of application No. PCT/CN2018/095093, filed on Jul. 10, 2018.

(30) Foreign Application Priority Data

Jun. 29, 2018 (CN) .......................... 2018 1 0704546

(51) Int. Cl.
*G09G 3/36* (2006.01)
*G02F 1/133* (2006.01)

(52) U.S. Cl.
CPC ....... *G09G 3/3696* (2013.01); *G02F 1/13306* (2013.01); *G09G 3/3688* (2013.01); *G09G 2300/0426* (2013.01); *G09G 2310/08* (2013.01); *G09G 2320/0209* (2013.01); *G09G 2320/0247* (2013.01); *G09G 2320/0673* (2013.01)

(58) Field of Classification Search
CPC .............. G09G 3/3696; G09G 3/3688; G09G 2300/0426; G09G 2310/08; G09G 2320/0209; G09G 2320/0247; G09G 2320/0673; G02F 1/13306
See application file for complete search history.

(56) References Cited

U.S. PATENT DOCUMENTS

2019/0206349 A1* 7/2019 An ....................... G09G 3/3614

* cited by examiner

*Primary Examiner* — Peter D McLoone
(74) *Attorney, Agent, or Firm* — Leong C. Lei (57) ABSTRACT

The invention provides a control circuit for an LCD panel and an LCD panel, wherein the control circuit is configured to drive an array pixel unit, and the control circuit comprises: a timing controller, a gamma voltage generation module, and a source a pole driver, wherein a first control end of the timing controller is connected to an input end of the gamma voltage generation module, and an output end of the gamma voltage generation module is connected to a first input end of the source driver, a second control end of the timing controller is connected to a second input end of the source driver, and an output end of the source driver is connected to a data line of the array pixel unit. The embodiment of the invention can reduce the level crosstalk generated during the LC displaying process and improve the flicker phenomenon of the screen.

14 Claims, 8 Drawing Sheets

CONTROL CIRCUIT FOR LCD PANEL AND LCD PANEL

CROSS-REFERENCE TO RELATED APPLICATIONS

This application is a continuing application of PCT Patent Application No. PCT/CN2018/095093, filed on Jul. 10, 2018, which claims priority to Chinese Patent Application No. CN201810704546.3, entitled "Control Circuit for LCD Panel and LCS Panel", filed on Jun. 29, 2018, both of which are incorporated herein by reference in their entireties.

BACKGROUND OF THE INVENTION

1. Field of the Invention

The present invention relates to the field of electronics, and in particular to the field of control circuit for liquid crystal display (LCD) panel and LCD panel.

2. The Related Arts

With the development of LCD and related technologies, the demands on the performance of LCD panels are becoming higher and higher. In addition to improvements in process manufacturing, relate drive circuit for LCD is also constantly improved, so that the LCD can display clear and stable images.

In general, in the normal operation of the LCD, to prevent the LC from aging, the polarity of the pixel voltage periodically changes around the common voltage (Vc) of the LCD. The pixel voltage is the voltage of the pixel electrode, and the common voltage is the voltage of the common electrode. When the absolute values of the voltage differences between the positive and negative period pixel voltage and the common voltage are different, a flicker phenomenon occurs.

To improve the flicker phenomenon caused by the difference in the absolute value of the voltage difference between the pixel voltage and the common voltage, the common voltage under an image of a specific grayscale can be adjusted to make the absolute values of the voltage difference between the pixel voltage and the common voltage of the positive and negative periods as equal as possible to minimize flickering. A common method is to choose the best Vc for an image with a grayscale of 255, and then, based on the best Vc, determine the gamma voltage of each grayscale point according to the best flicker (minimum flicker). But, in such case, the common voltage and the data line voltage generated by the coupling capacitor (also known as parasitic capacitance) is large, which will pull up the voltage of Vc, causing the voltage difference stored in the LC to shrink, therefore, the grayscale will change to cause level crosstalk.

SUMMARY OF THE INVENTION

The embodiments of the present invention provide a control circuit for LCD panel and an LCD panel, able to reduce the level crosstalk generated during LC displaying and improve the flicker phenomenon.

The embodiment of the present invention provides a control circuit for LCD panel, wherein the control circuit is configured to drive an array pixel unit, and the control circuit comprises: a timing controller, a gamma voltage generation module, and a source driver, wherein:

a first control end of the timing controller is connected to an input end of the gamma voltage generation module, and an output end of the gamma voltage generation module is connected to a first input end of the source driver, a second control end of the timing controller is connected to a second input end of the source driver, and an output end of the source driver is connected to a data line of the array pixel unit;

when the timing controller detects crosstalk in an LCD screen, the timing controller controls the gamma voltage generation module to output a symmetric gamma voltage to the source driver, the source driver output a symmetric data line voltage to the data line of the array pixel unit, the symmetric data line voltage is obtained according to voltage division of the symmetric gamma voltage; the symmetric data line voltage comprises a first positive frame voltage and a first negative frame voltage, an absolute value of a difference between the first positive frame voltage and a common voltage is equal to an absolute value of a difference between the first negative frame voltage and the common voltage;

when the timing controller detects that crosstalk not occurring on the LCD screen and the LCD screen flickers, the timing controller controls the gamma voltage generation module to generate and output an asymmetric gamma voltage to the source driver, the source driver outputs an asymmetric data line voltage to the data line of the array pixel unit, and the asymmetric data line voltage is obtained according to voltage division of the asymmetric gamma voltage, the asymmetric gamma voltage is configured to minimize flicker of the LCD screen; the asymmetric data line voltage comprises a second positive frame voltage and a second negative frame voltage, an absolute value of a difference between the second positive frame voltage and a common voltage is not equal to an absolute value of a difference between the second negative frame voltage and the common voltage.

Another embodiment of the present invention provides an LCD panel, which comprises: an array pixel unit, a gate driving circuit and a control circuit provided in the previous embodiment.

The control circuit provided by the embodiment of the invention can control the gamma voltage generation module to output a symmetric gamma voltage when crosstalk occurs on the LCD screen, and the source driver can output the symmetric data line voltage with reference to the symmetric gamma voltage, thereby reducing the data line level crosstalk caused by parasitic capacitance on the data line voltage and common voltage; when there is no crosstalk on the LCD but flicker occurs, the gamma voltage generation module can be controlled to output an asymmetric gamma voltage, and the source driver can refer to the asymmetric gamma voltage to output the asymmetric data line voltage to improve the flicker phenomenon. In general, the optimization effect of reducing the flicker and reducing the level crosstalk can be realized, that is, the level crosstalk generated in the LC displaying process can be reduced and the flicker phenomenon can be improved.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

DETAILED DESCRIPTION OF THE PREFERRED EMBODIMENTS

The technical solutions in the embodiments of the present invention are clearly and completely described in the following with reference to the accompanying drawings in the embodiments of the present invention. It is obvious that the described embodiments are a part of the embodiments of the present invention, but not all of the embodiments. References to "embodiments" herein mean that the specific features, structures, or characteristics described in connection with the embodiments can be included in at least one embodiment of the invention. The appearances of the phrases in various places in the specification are not necessarily referring to the same embodiments, and are not exclusive or alternative embodiments that are mutually exclusive. Those skilled in the art will understand and implicitly understand that the embodiments described herein can be combined with other embodiments.

All other embodiments obtained by those skilled in the art based on the embodiments of the present invention without creative efforts are within the scope of the present invention.

The terms "comprising" and "having" and any variations thereof appearing in the specification, claims, and drawings of the present application are intended to cover non-exclusive inclusion. For example, a process, method, system, product, or device that includes a series of steps or units is not limited to the listed steps or units, but optionally also includes steps or units not listed, or alternatively, other steps or units inherent to these processes, methods, products or equipment. In addition, the terms "first", "second" and "third" are used to distinguish different objects, and are not intended to describe a particular order.

It is also to be understood that the terminology of the present invention is to be construed as a descriptive purpose, instead of restrictive purpose. As used in the description of the invention and the appended claims, unless the context clearly indicates otherwise, the singular forms "a", "one" and "the" also include plural forms.

It is further understood that the term "and/or" used in the description of the invention and the appended claims means any combination and all possible combinations of one or more of the associated listed items.

As used in this specification and the appended claims, the term "if" can be interpreted as "When" or "on" or "in response to determining" or "in response to detecting" depending on the context. Similarly, the phrase "if determined" or "if detecting [a described condition or event]" can be interpreted as meaning "once determined" or "in response to determining" or "once detected [the described condition or event] or "Respond to the detection of [described condition or event]".

The grayscale mentioned in the embodiment of the present invention refers to the degree of the brightness. For digital display technology, grayscale is the determining factor in the number of colors displayed. In general, the higher the grayscale, the richer the displayed color, the finer the image, and the more detailed the details. The logarithmic relationship between white and black is divided into several scales, called "grayscale", the range is generally from 0 to 255, white is 255, black is 0, so black and white pictures are also called grayscale images. A similar concept to the grayscale is gray level. An image can be defined as a two-dimensional function f(x, y), where x and y are space planar coordinates, in any pair of coordination (x, y), the size of f is called the intensity of the image at this point or the gray level. That is, the gray level refers to the level of the intensity of the electromagnetic wave emitted by the object on the black and white image and is the scale of the spectral characteristics of the ground object.

The pixel is also known as picture element, and the pixels are only the size units of the resolution, not the image quality. Like the photography, digital images also have continuous tone and tone. If the image is magnified several times, these continuous colors are actually composed of many small squares with similar colors. These small squares constitute the image. The smallest unit—the pixel. This minimal graphics unit is usually a single coloring point on the screen. The higher the number of pixels, the larger the color palette is, and the more realistic the color. By definition, the pixel refers to the basic encoding of the basic primary pigment and grayscale herein.

In general, the LCD panel comprises a timing controller, a source driver (source driving circuit), a gate driver (gate driving circuit), a gamma chip, and so on. The gamma chip may be used to generate a gamma voltage for controlling the grayscale of the display. The grayscale can be generally divided into fourteen groups (G0 ~G14). The difference between the different gamma voltages and Vc causes different the LC rotation angle to form the difference in brightness. The best condition of Vc is located at the median between G0 and G14, so the flickering condition of LCD screen will be the best. The LC needs dynamic voltage control, otherwise the LC is easy to form inertia. The voltage difference between G0-G14 and Vc constitutes a voltage mode similar to a sine wave, which avoids the inertia stagnation of the LC under the same brightness. The data line voltage is also called the source driver voltage. The source driver can supply the voltage to the TFT corresponding to each column of pixel unit through a plurality of D lines. Specifically, the data line voltage applied to each pixel can also be referred to as the pixel voltage. The data line voltage is divided into a positive frame voltage and a negative frame voltage. The pixel voltage of a pixel alternates between the positive frame voltage and the negative frame voltage. The array unit is driven to realize the display function.

Figure 1:
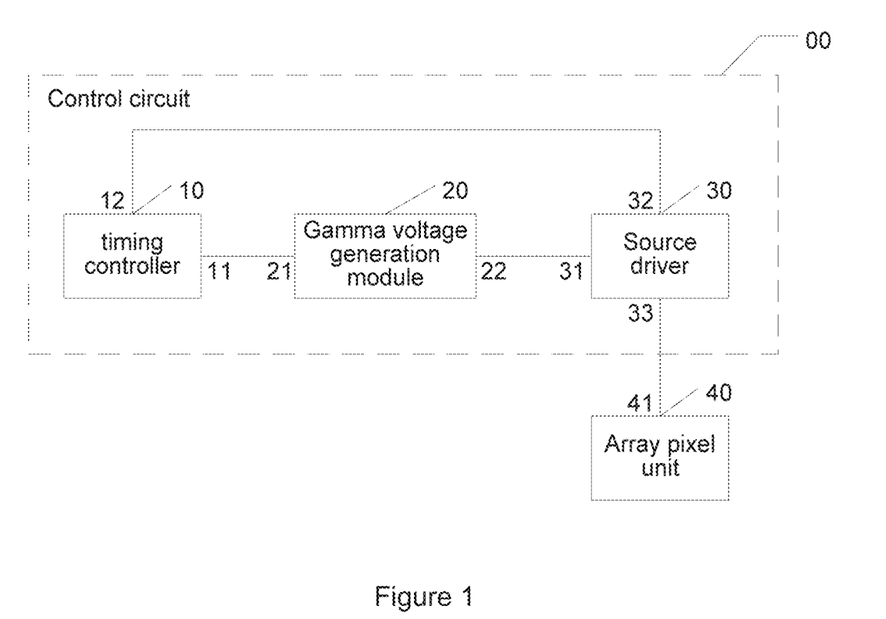
FIG. 1 is a schematic view showing the control circuit for LCD according to an embodiment of the present invention.

As shown in FIG. 1, FIG. 1 is a schematic view showing the control circuit for LCD panel according to the embodiment of the present invention. The control circuit is configured to drive an array pixel unit. As shown in FIG. 1, the control circuit comprises: a timing controller 10, a gamma voltage generation module 20, a source driver 30, and an array pixel unit 40, wherein:

a first control end 11 of the timing controller 10 is connected to an input end 21 of the gamma voltage generation module 20, and an output end 22 of the gamma voltage generation module 20 is connected to a first input end 31 of the source driver 30, a second control end 12 of the timing controller 10 is connected to a second input end 32 of the source driver 30, and an output end 33 of the source driver 30 is connected to a data line 41 of the array pixel unit 40;

when the timing controller 10 detects crosstalk in an LCD screen, the timing controller 10 controls the gamma voltage generation module 20 to output a symmetric gamma voltage to the source driver 30, the source driver 30 output a symmetric data line voltage to the data line 41 of the array pixel unit 40, the symmetric data line voltage is obtained according to voltage division of the symmetric gamma voltage; the symmetric data line voltage comprises a first positive frame voltage and a first negative a frame voltage, an absolute value of a difference between the first positive frame voltage and a common voltage is equal to an absolute value of a difference between the first negative frame voltage and the common voltage;

when the timing controller 10 detects that crosstalk not occurring on the LCD screen and the LCD screen flickers, the timing controller 10 controls the gamma voltage generation module 20 to generate and output an asymmetric gamma voltage to the source driver 30, the source driver 30 outputs an asymmetric data line voltage to the data line 41 of the array pixel unit 40, and the asymmetric data line voltage is obtained according to voltage division of the asymmetric gamma voltage, the asymmetric gamma voltage is configured to minimize flicker of the LCD screen; the asymmetric data line voltage comprises a second positive frame voltage and a second negative frame voltage, an absolute value of a difference between the second positive frame voltage and a common voltage is not equal to an absolute value of a difference between the second negative frame voltage and the common voltage.

Specifically, when the timing controller 10 detects crosstalk in the LCD screen, the timing controller 10 can control the gamma voltage generation module 20 to output a symmetric gamma voltage to the source driver 30, and the gamma voltage is used to control the grayscale of the display. The symmetric gamma voltage is generally divided into two sets of the same number of voltages, which are used for voltage division to generate a positive frame voltage and a negative frame voltage among a plurality of D line voltages.

The number of symmetric gamma voltages may be 2N, and the 2N symmetric gamma voltages are sequentially arranged from high to low or low to high. The first voltage difference of the symmetric gamma voltage is equal to the second voltage difference, the first voltage difference is a difference between a first voltage value and an Nth voltage value of the symmetric gamma voltage, and the second voltage difference is the difference between an (N+1)th voltage value and a (2N)th voltage value of the symmetric gamma voltage, N is a positive integer greater than 1. In general, Vc is the median value of the symmetric gamma voltage, that is, the average value of the first voltage value and the second 2N voltage value.

For example, for N=7, that is, 7 groups (14) of gamma voltages are set: 14V, 13V, 12V, 11V, 10V, 9V, 8V, 7V, 6V, 5V, 4V, 3V, 2V, 1V. These 14 symmetrical gamma voltages are sequentially arranged from high to low, and is also 6V. These 14 gamma voltages may be referred to as symmetrical gamma voltages, and if the above conditions are not satisfied, these voltages are asymmetric gamma voltages. Referring to the symmetrical gamma voltages shown in Table 1, 14 symmetrical gamma voltages GM1-GM14 are arranged in order of high to low, and the difference between GM1 and GM7 is equal to the difference between GM8 and GM14.

TABLE 1

Symmetric Gamma Voltage

|      |       | Difference between GM1 and GM7 |
|------|-------|--------------------------------|
| GM1  | 14.2  | 6.18                           |
| GM2  | 14.09 |                                |
| GM3  | 12.36 |                                |
| GM4  | 11.1  |                                |
| GM5  | 10.16 |                                |
| GM6  | 8.42  |                                |
| GM7  | 8.02  |                                |
| GM8  | 6.62  |                                |
|      |       | Difference between GM8 and GM14 |
| GM9  | 6.22  | 6.18                           |
| GM10 | 4.48  |                                |
| GM11 | 3.54  |                                |
| GM12 | 2.28  |                                |
| GM13 | 0.55  |                                |
| GM14 | 0.44  |                                |

The symmetric data line voltage comprises a first positive frame voltage and a first negative frame voltage. The first positive frame voltage and the first negative frame voltage represent D line voltages of different frames at a pixel point. If 2N symmetric gamma voltages are set and arranged from high to low, the first N symmetric gamma voltages are used for voltage division to obtain the positive frame voltage in the symmetric data line voltage, and the last N symmetric gamma voltages are used for voltage division to obtain the negative frame voltage in the symmetric data line voltage. The first positive frame voltage can be understood as any one of the positive frame voltages, and the first negative frame voltage is a negative frame voltage corresponding to the first positive frame voltage. Through the symmetric gamma voltage, the obtained absolute value of the difference between the first positive frame voltage and the common voltage is equal to the absolute value of the difference between the first negative frame voltage and the common voltage.

Figure 2A:
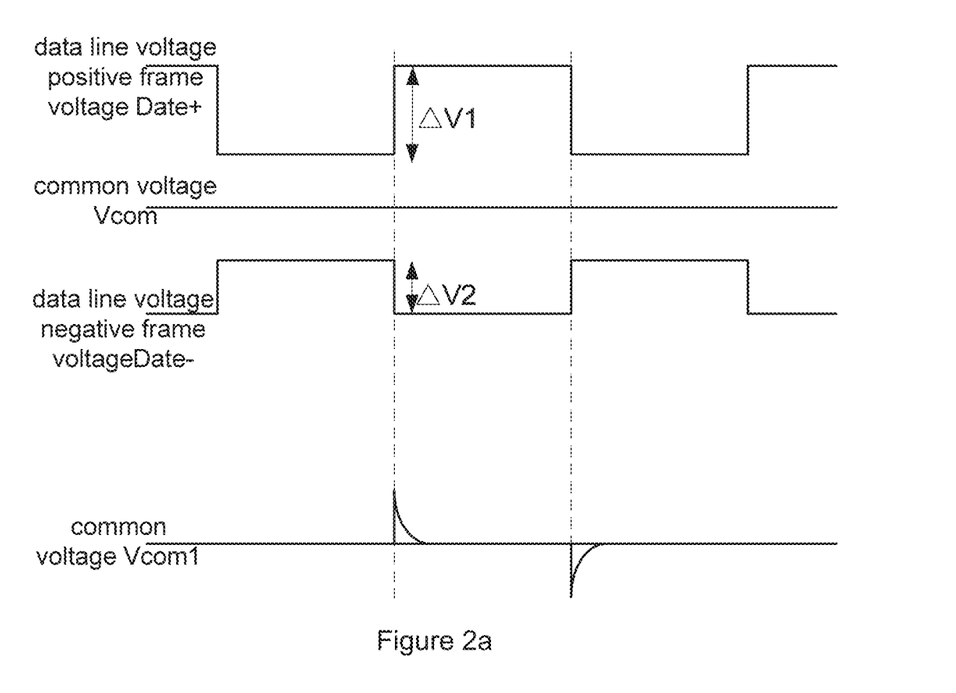
FIG. 2a is a schematic view showing the asymmetric data line voltage according to the embodiment of the present invention.
Figure 2B:
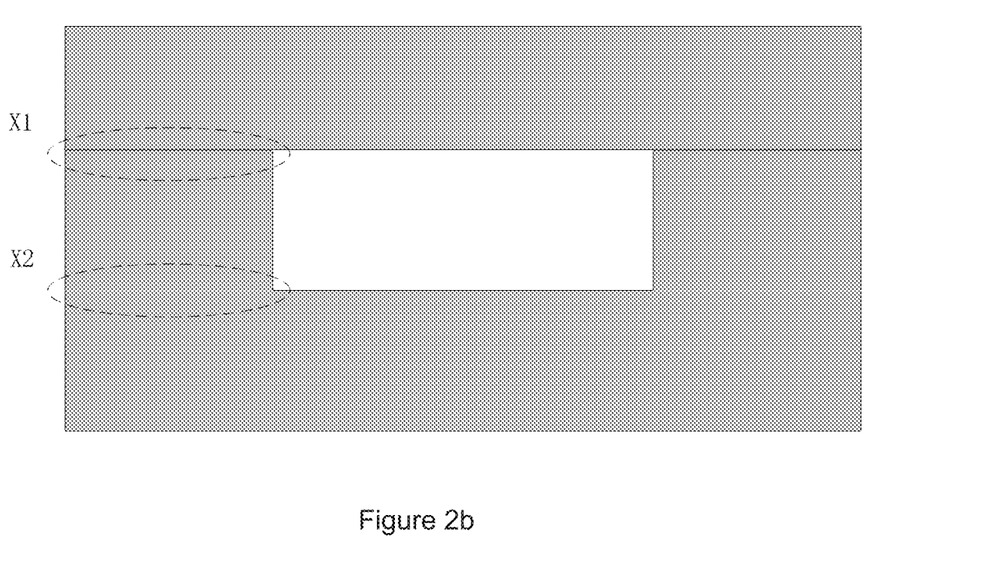
FIG. 2b is a schematic view showing the level crosstalk interface according to the embodiment of the present invention.

As shown in FIG. 2a, D+ and D− are the data line voltages of one column of pixel units of the array pixel unit. D+ is the positive frame voltage of the data line voltage, and D− is the negative frame voltage of the data line voltage. The absolute value of voltage change ΔV1 of D+ is greater than the absolute value of the corresponding voltage change ΔV2 of D−., which should be understood as that the data line voltage is asymmetric and may affect the stability of Vc. That is, the above-mentioned D line voltage and the above common voltage may generate coupling capacitance. As the Vc1 shown in the figure, the common voltage is affected by a sudden change. According to the difference between the positive frame voltages of the data line voltage of adjacent pixels and the difference between the negative frame voltages of the data line voltage of the adjacent pixels, the grayscale changes, and different levels of horizontal crosstalk may occur between adjacent pixels of the LCD screen. Taking the data line voltage as shown in the figure as an example, level crosstalk (X_talk) X1 and X2 as shown in FIG. 2b may be generated. The grayscale of the pixel of X1 row is lower than the grayscale of the adjacent pixel of the same column, thus showing a darker color. The grayscale of the pixel of X2 row is higher than that of the adjacent pixel of the same column, thus showing a lighter color, affecting the display effect.

Figure 3:
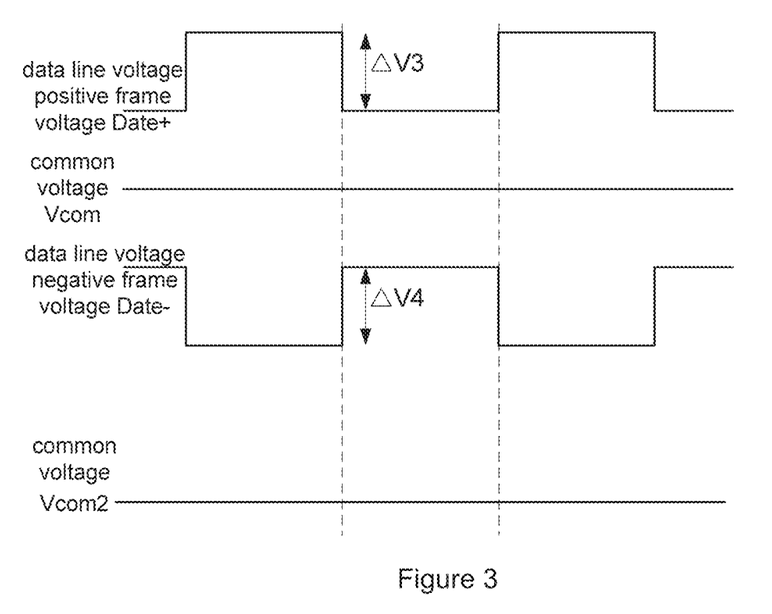
FIG. 3 is a schematic view showing the symmetric data line voltage according to the embodiment of the present invention.

As shown in FIG. 3, D+ and D− in the figure can represent the symmetric data line voltages obtained by the above-mentioned symmetric gamma voltage division, D+ is the positive frame voltage of the symmetric data line voltage, and D− is the negative frame voltage of the symmetric data line voltage. The absolute values of the differences respectively between D+ and D− and the common voltage Vc are equal, and Vc2 represents the actual common voltage (no deviation compared with the set Vc), and the influence on Vc is completely cancelled out and ensures the absolute value of voltage change ΔV3 of D+ and the absolute value of the voltage change ΔV4 of D−; therefore, by inputting the above symmetrical D line voltages to the above array pixel unit, and the level crosstalk phenomenon can be reduced.

The above asymmetric gamma voltage is set to minimize the flicker of the LCD screen. Specifically, in general, in the display adjustment phase of the display screen, a grayscale image may be selected (for example, an image with grayscale level of 255). By adjusting the voltage value of Vc to minimize the flicker of the image, Vc in this case is the best Vc. Based on the best Vc, the gamma voltage is still determined according to the principle of making the flicker of the image the lowest. The gamma voltage at this point is an asymmetric gamma voltage, as opposed to the symmetric gamma voltage. The absolute value of the difference between the second positive frame voltage and the common voltage obtained by the voltage division of asymmetrical gamma voltage is not equal to absolute value of the difference between the second negative frame voltage and the common voltage, but can improve the flicker phenomenon that appears on the LCD screen. For example, the asymmetric gamma voltages (G01-G14) shown in Table 2, which are set to minimize the flicker of the LCD screen, are input to the array pixel unit. The asymmetric data line voltage obtained by the above asymmetric gamma voltage can improve the flicker phenomenon of the LCD screen.

TABLE 2

Asymmetric gamma voltage

| | | Difference between GM1 and GM7 |
|---|---|---|
| G01 | 14.2 | 5.42 |
| G02 | 14.09 | |
| G03 | 12.36 | |
| G04 | 11.32 | |
| G05 | 10.87 | |
| G06 | 8.97 | |
| G07 | 8.78 | |
| G08 | 7.39 | |
| | | Difference between GM8 and GM14 |
| G09 | 7.19 | 6.94 |
| G010 | 5.27 | |
| G11 | 4.29 | |
| G12 | 2.7 | |
| G13 | 0.57 | |
| G14 | 0.43 | |

The LCD is constructed by placing a liquid crystal cell between two parallel glass substrates, a thin film transistor (TFT) on the lower substrate glass, and a color filter on the upper substrate glass. The direction of rotation of the LC molecules is controlled by the signal and voltage changes on the TFT, so as to control whether the polarized light of each pixel point is emitted or not to achieve the display function.

The array pixel unit is a set of pixels for performing a display function on the LC screen, each pixel corresponds to a TFT, and the array pixel unit comprises a plurality of columns of pixel units, and each pixel corresponds to a TFT.

Figure 4:
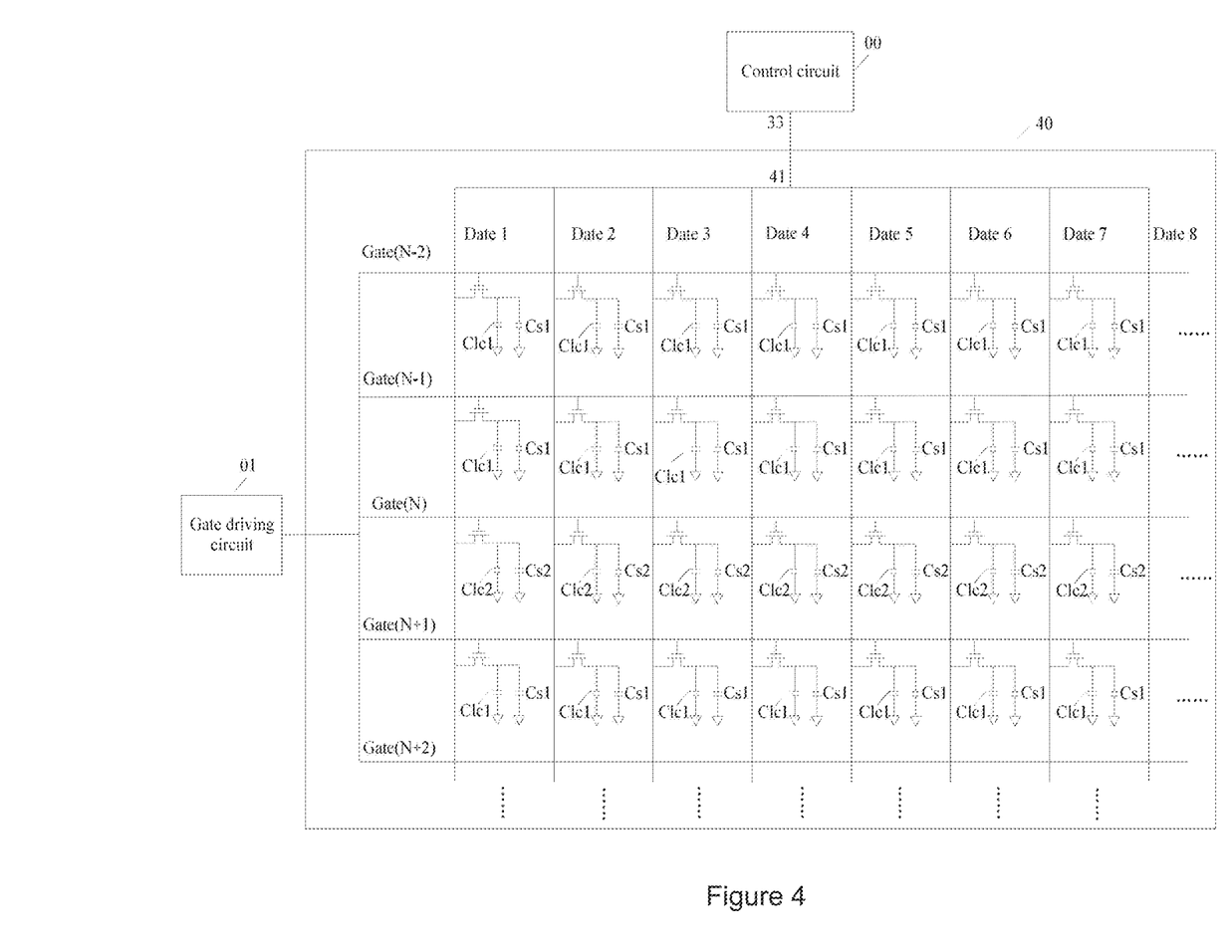
FIG. 4 is a schematic view showing the structure of the control circuit for LCD according to the embodiment of the present invention.

FIG. 4 is a schematic structural view of a driving circuit for display panel, comprising a control circuit 00, a gate driving circuit 01, and an array pixel unit 40. The control circuit 00 is configured to provide the TFT corresponding to each column of pixel unit the above D line signal (such as D1, D2, D3, D4, D5, D6, D7, D8, etc.) through a data line. In fact, the control circuit can provide corresponding D line voltage for each pixel in the array pixel unit (including positive frame voltage and negative frame voltage). The gate driving circuit 01 is configured to provide a gate scan signal (G(N−2), G(N−1), G(N), G(N+1), G(N+2), etc.) for the TFT corresponding to each row of pixels.

The flicker appearing in the LCD is mainly because the actual positive frame voltage of a certain pixel is asymmetric with the negative frame voltage, that is, the difference between the positive frame voltage and the common voltage is not equal to the difference between the negative frame voltage and the common voltage. As such, a difference between light and dark appears in the adjacent two frames, that is, a flicker phenomenon is formed.

The timing controller 10 can detect crosstalk occurring on the LCD screen, and specifically:

the timing controller 10 can detect the difference between the first positive frame voltages of the adjacent pixels of the first column of pixels of the array pixel unit 40 and the difference between the first negative frame voltages of the adjacent pixels are not equal, wherein the first column of pixel units is any one of the multi-column pixel units comprised in the array pixel unit.

Wherein, for the same pixel of the LCD, the data line voltage is divided into two polarities, that is, a positive frame voltage higher than Vc and a negative frame voltage lower than Vc, and the two voltage polarities of the same pixel are continuously alternating by frames. For example, the timing controller 10 detects that the difference of between the positive frame voltages of the sixth pixel of the third column of pixel units of the array pixel unit 40 and the seventh pixel is 2V, and the difference of between the negative frame voltages of the sixth pixel of the third column of pixel units of the array pixel unit 40 and the seventh pixel is 1V, that is, the difference between the positive frame voltages of the two adjacent pixels and the difference between the negative frame voltages is not equal, and the timing controller 10 determines that the crosstalk is detected on the LCD screen.

Optionally, the timing controller can detect crosstalk of the LCD screen by using an image processing algorithm. The timing controller stores image processing algorithms and D. The timing controller can perform statistical analysis on the input D such as the voltage at the input end to determine whether level crosstalk will occur under a specified screen when using the input D. IN other words, before the input D has been converted into the data line voltage and enters the array pixel unit, the timing controller can detect that the level crosstalk is generated under a specified screen after the input D is converted into the data line voltage.

The control circuit provided by the embodiment of the invention can control the gamma voltage generation module to output a symmetric gamma voltage when crosstalk occurs on the LCD screen, and the source driver can output the symmetric data line voltage with reference to the symmetric gamma voltage, thereby reducing the data line level crosstalk caused by parasitic capacitance on the data line voltage and common voltage; when there is no crosstalk on the LCD but flicker occurs, the gamma voltage generation module can be controlled to output an asymmetric gamma voltage, and the source driver can refer to the asymmetric gamma voltage to output the asymmetric data line voltage to improve the flicker phenomenon. In general, the optimization effect of reducing the flicker and reducing the level crosstalk can be realized, that is, the level crosstalk generated in the LC displaying process can be reduced and the flicker phenomenon can be improved.

In an optional embodiment, the gamma voltage generation module 20 further comprises a first memory 201 for storing a symmetric gamma voltage and a second memory 202 for storing an asymmetric gamma voltage;

the aforementioned step that the timing controller 10 controls the gamma voltage generation module 20 to output the symmetric gamma voltage to the source driver 30 can be the timing controller 10 controls the gamma voltage generation module 20 to obtain the symmetric gamma voltage stored in the first memory 201 and output the above symmetric gamma voltage to the source driver 30;

the aforementioned step that the timing controller 10 controls the gamma voltage generation module 20 to output the asymmetric gamma voltage to the source driver 30 can be the timing controller 10 controls the gamma voltage generation module 20 to obtain the asymmetric gamma voltage stored in the second memory 202 and output the asymmetric gamma voltage to the source driver 30.

Optionally, the gamma voltage generation module may comprise a first memory and a second memory for storing respectively the symmetric gamma voltage and the asymmetric gamma voltage. The user can pre-select the gamma voltage to be set and store in the memory, and control the gamma voltage generation module to output corresponding gamma voltage (symmetric or asymmetric) according to the specified signal sent by the timing controller after detecting the display condition. In the case where the output gamma voltage is required, the gamma voltage generation module 20 can directly obtain and output the gamma voltage in the first memory or the second memory through the specified signal of the timing controller. Through the above memory, the required gamma voltage can be conveniently preset and stored in the gamma voltage generation module. Under the control of the timing controller, the gamma voltage generation module can select an appropriate voltage value to generate the gamma voltage for output.

Optionally, the gamma voltage generation module can be a programmable gamma correction buffer circuit chip (P_Gamma IC). Compared with the traditional gamma correction circuit chip, the P_Gamma IC has the same essence, adds a programmable function, can realize functions such as voltage storage, and can more flexibly control the generation of gamma voltage (symmetric gamma voltage or asymmetric gamma voltage).

Figure 5:
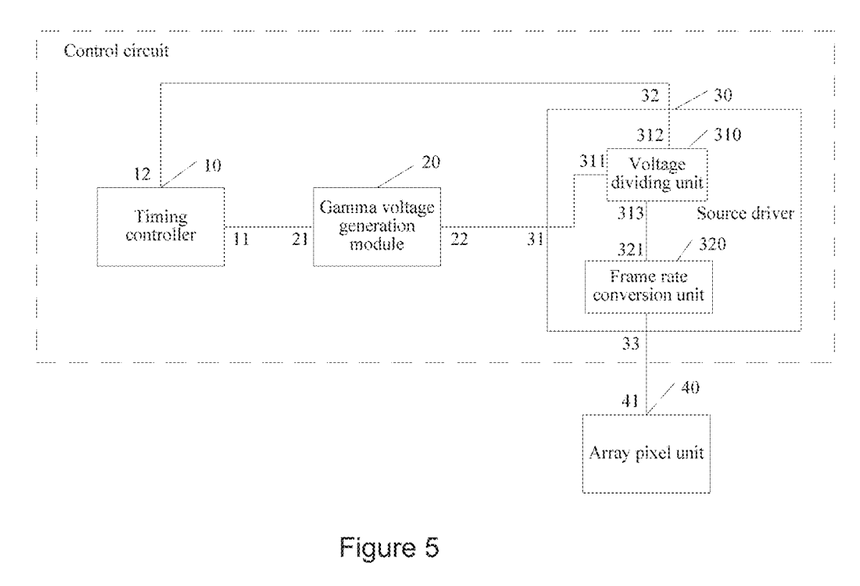
FIG. 5 is a schematic view showing of the control circuit for LCD according to another embodiment of the present invention.

FIG. 5 is a schematic view of a control circuit for LCD panel provided by the present invention, which is optimized based on the control circuit of the LCD panel shown in FIG. 1, wherein the source driver 30 may further comprise a voltage dividing unit 310. The first input end 311 of the voltage dividing unit 310 is connected to the first input end 31 of the source driver 30, and the second input end 312 of the voltage dividing unit 310 is connected to the second input end 32 of the source driver; the voltage dividing unit 310 may comprise a plurality of voltage dividing resistors.

After the timing controller 10 controls the gamma voltage generation module 20 to output the symmetric gamma voltage to the source driver 30, the voltage dividing unit 310 may divide the symmetric gamma voltage to obtain a first number of symmetrical divided voltages. The source driver 30 further comprises a frame rate conversion unit 320. The input end 321 of the frame rate conversion unit 320 is connected to the output end 313 of the voltage dividing unit 310. The output end of the frame rate conversion unit 320 is the output end 33 of the source driver 30. The frame rate conversion unit 320 may process the symmetric divided voltage to obtain a second number of the symmetric data line voltage, and the second number is greater than the first number.

Figure 6:
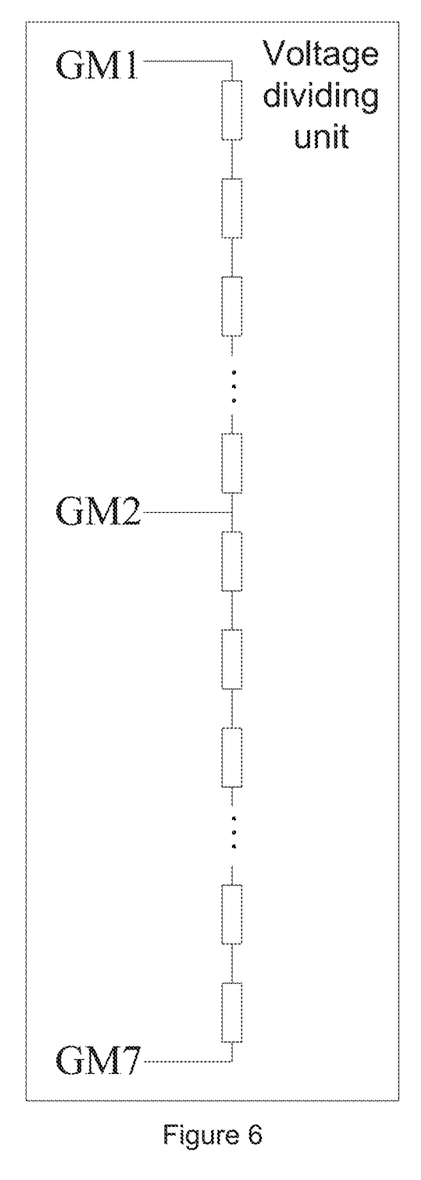
FIG. 6 is a schematic view showing the structure of voltage dividing unit according to the embodiment of the present invention.

The voltage dividing unit comprises a plurality of voltage dividing resistors, and the voltage dividing resistors are connected in series to divide the gamma voltage. That is, the gamma voltage can be divided into a larger number of voltages, for example, 2N gamma voltages are divided into $2^{2N}$ divided voltages, because there are N gamma voltages in the 2N gamma voltages corresponding to the positive and negative frames respectively, that is, the gamma voltage is actually N sets of voltages, and $2^{2N}$ divided voltages generated by voltage division comprises $2^{2N}$ gamma voltages corresponding to positive and negative frames. Refer to the voltage dividing unit shown in FIG. 6. Taking 14 (GM1-GM14) symmetrical gamma voltages as an example, the voltage division by the voltage dividing resistors in the voltage dividing unit can produce $2^7=64$ groups (128) of symmetrical voltages, as shown in the figure, the voltage dividing unit can separately divide the GM1-GM7 which generates the positive frame voltage in the symmetrical gamma voltage and divide the GM7-GM14 which generates the negative frame voltage. Optionally, the voltage dividing unit may also divide the symmetric gamma voltages GM1-GM14 together. When the gamma voltage is an asymmetric gamma voltage, the operation of dividing the voltage by the voltage dividing unit is the same. The use of voltage divider resistors can better generate a sufficient number of voltages to provide the required D line voltage for all pixels.

Furthermore, the frame rate conversion unit 320 may process the symmetric divided voltage, for example, double the number of the symmetric divided voltages to obtain 128 sets (256) of the symmetric data line voltages, wherein two D line voltages of each group can be understood as the positive frame voltage and the negative frame voltage of one pixel element, for example, the positive frame voltage 13V and the negative frame voltage 2V; the absolute value of the difference between the positive frame voltage and the common voltage is equal to the absolute value of the difference between the negative frame voltage and the above common voltage. For example, the above common voltage is 7.5V, the absolute value of the difference between the positive frame voltage 13V and the common voltage is 5.5V, and the absolute value of the difference between the negative frame voltage 2V and the common voltage is also 5.5V.

The timing controller can control the gamma voltage generation module to output the gamma voltage of the according to the display condition of the LCD screen, the source driver divides the gamma voltage by the voltage dividing unit, and the frame rate converting unit further converts to obtain the pixel voltage that matches the number of pixels (output by column in the form of D line voltage).

The embodiment of the present invention further provides a liquid crystal display panel, which comprises an array pixel unit, a gate driving circuit and a control circuit of any one of the above embodiments.

Figure 7:
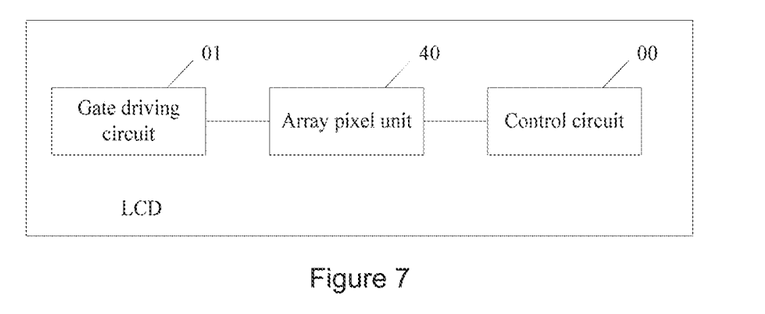
FIG. 7 is a schematic view showing the structure of the LCD panel according to the embodiment of the present invention.

FIG. 7 is a schematic structural view of an LCD panel, which comprises the array pixel unit 40, the gate driving circuit 01, and any control circuit of the above embodiments. The specific structure can also refer to FIG. 4, which shows a schematic view of the structure of the control circuit of the LCD panel, and the description will not be repeated herein.

Those of ordinary skill in the art will appreciate that the elements and algorithm steps of the various examples described in connection with the embodiments disclosed herein can be implemented in electronic hardware, computer software, or a combination of both. For clarity of interchangeability of the hardware and software, the explanation has been generally described in terms of the functions and steps of the examples in the above description. Whether these functions are performed in hardware or software depends on the specific application and design constraints of the solution. A person skilled in the art can use different methods for implementing the described functions for each particular application, but such implementation should not be considered to be beyond the scope of the present invention.

In the several embodiments provided by the present application, it should be understood that the disclosed circuit or device may be implemented in other manners. For example, the device embodiments described above are merely illustrative. For example, the division of the module is only a logical function division. In actual implementation, there may be another division manner, for example, multiple modules or components may be combined. Or it can be integrated into another system, or some features can be ignored or not executed. In addition, the mutual coupling or direct coupling or communication connection shown or discussed may be an indirect coupling or communication connection through some interfaces, devices or units, or an electrical, mechanical or other form of connection.

The units (modules) described as the separate components may or may not be physically separated, and the components displayed as the units may or may not be physical units, that is, may be located in one place, or may be distributed to multiple network units. Some or all of the units may be selected according to actual needs to achieve the objectives of the embodiments of the present invention.

In addition, each functional unit in each embodiment of the present invention may be integrated into one processing unit, or each unit may exist physically separately, or two or more units may be integrated into one unit. The above integrated unit can be implemented in the form of a hardware or a software functional unit.

The control circuit for liquid crystal display panel and the liquid crystal display panel disclosed in the embodiments of the present invention are described in detail. The principles and embodiments of the present invention described are only for helping the method of the present invention and core idea to be understood. Any modification of equivalent structure or equivalent process made according to the disclosure and drawings of the present invention, or any application thereof, directly or indirectly, to other related fields of technique, is considered encompassed in the scope of protection defined by the claim of the present invention.

What is claimed is:

1. A control circuit for liquid crystal display (LCD) panel, wherein the control circuit is configured to drive an array pixel unit, and the control circuit comprises: a timing controller, a gamma voltage generation module, a source driver, and an array pixel unit, wherein: a first control end of the timing controller is connected to an input end of the gamma voltage generation module, and an output end of the gamma voltage generation module is connected to a first input end of the source driver, a second control end of the timing controller is connected to a second input end of the source driver, and an output end of the source driver is connected to a data line of the array pixel unit;

when the timing controller detects crosstalk in an LCD screen, the timing controller controls the gamma voltage generation module to output a symmetric gamma voltage to the source driver, the source driver output a symmetric data line voltage to the data line of the array pixel unit, the symmetric data line voltage is obtained according to voltage division of the symmetric gamma voltage; the symmetric data line voltage comprises a first positive frame voltage and a first negative a frame voltage, an absolute value of a difference between the first positive frame voltage and a common voltage is equal to an absolute value of a difference between the first negative frame voltage and the common voltage;

when the timing controller detects that crosstalk not occurring on the LCD screen and the LCD screen flickers, the timing controller controls the gamma voltage generation module to generate and output an asymmetric gamma voltage to the source driver, the source driver outputs an asymmetric data line voltage to the data line of the array pixel unit, and the asymmetric data line voltage is obtained according to voltage division of the asymmetric gamma voltage, the asymmetric gamma voltage is configured to minimize flicker of the LCD screen; the asymmetric data line voltage comprises a second positive frame voltage and a second negative frame voltage, an absolute value of a difference between the second positive frame voltage and a common voltage is not equal to an absolute value of a difference between the second negative frame voltage and the common voltage;

wherein when timing controller detects crosstalk on the LCD screen, comprising:
the timing controller detects that a difference between the first positive frame voltages of the adjacent pixels of the first column of pixel unit of the array pixel unit and a difference between the first negative frame voltages of the adjacent pixels are not equal, and the first column of pixel unit is any one of the multi-column pixel units comprised in the array pixel unit;

wherein the gamma voltage generation module comprises a first memory for storing the symmetric gamma voltage and a second memory for storing the asymmetric gamma voltage; the timing controller controlling the gamma voltage generation module to output a symmetric gamma voltage to the source driver comprises:
the timing controller controlling the gamma voltage generation module to obtain the symmetric gamma voltage stored in the first memory, and outputting the symmetric gamma voltage to the source driver;
the timing controller controlling the gamma voltage generating module to output an asymmetric gamma voltage to the source driver comprises:
the timing controller controlling the gamma voltage generating module to obtain the asymmetric gamma voltage stored in the second memory, and outputting the asymmetric gamma voltage to the source driver.

2. The control circuit for LCD panel as claimed in claim 1, wherein when timing controller detects crosstalk on the LCD screen, comprising:
the timing controller detects crosstalk of the LCD screen by using an image processing algorithm.

3. The control circuit for LCD panel as claimed in claim 1, wherein the source driver comprises a voltage dividing unit, and the voltage dividing unit comprises a plurality of voltage dividing resistors;
after the timing controller controls the gamma voltage generation module to output a symmetric gamma voltage to the source driver, the voltage dividing unit divides the symmetric gamma voltage to obtain a first number of symmetry divided voltages.

4. The control circuit for LCD panel as claimed in claim 3, wherein the voltage dividing unit is also used in:
after the timing controller controls the gamma voltage generation module to output an asymmetric gamma voltage to the source driver, dividing the asymmetric gamma voltage to obtain a first number of asymmetric divided voltages.

5. The control circuit for LCD panel as claimed in claim 3, wherein the source driver further comprises a frame rate conversion unit, the frame rate conversion unit processes the symmetric divided voltage to obtain a second number of the symmetric data line voltages, and the second number is greater than the first number.

6. The control circuit for LCD panel as claimed in claim 5, wherein the number of symmetric gamma voltages is 2N, and the 2N symmetric gamma voltages are sequentially arranged from high to low or low to high; the first voltage difference of the symmetric gamma voltage is equal to the second voltage difference, the first voltage difference is a difference between a first voltage value and an Nth voltage value of the symmetric gamma voltages, and the second voltage difference is a difference between an (N+1)th voltage value and an (2N)th voltage value of the symmetric gamma voltages, the N is a positive integer greater than one.

7. The control circuit for LCD panel as claimed in claim 1, wherein the gamma voltage generation module comprises a programmable gamma correction buffer circuit chip.

8. A liquid crystal display (LCD) panel, comprising: an array pixel unit, a gate driving circuit, and a control circuit for LCD panel as claimed in claim 1;
wherein when timing controller detects crosstalk on the LCD screen, comprising:
the timing controller detects that a difference between the first positive frame voltages of the adjacent pixels of the first column of pixel unit of the array pixel unit and a difference between the first negative frame voltages of the adjacent pixels are not equal, and the first column of pixel unit is any one of the multi-column pixel units comprised in the array pixel unit;
wherein the gamma voltage generation module comprises a first memory for storing the symmetric gamma voltage and a second memory for storing the asymmetric gamma voltage; the timing controller controlling the gamma voltage generation module to output a symmetric gamma voltage to the source driver comprises:
the timing controller controlling the gamma voltage generation module to obtain the symmetric gamma voltage stored in the first memory, and outputting the symmetric gamma voltage to the source driver;
the timing controller controlling the gamma voltage generating module to output an asymmetric gamma voltage to the source driver comprises:
the timing controller controlling the gamma voltage generating module to obtain the asymmetric gamma voltage stored in the second memory, and outputting the asymmetric gamma voltage to the source driver.

9. The LCD panel as claimed in claim 8, wherein when timing controller detects crosstalk on the LCD screen, comprising:
the timing controller detects crosstalk of the LCD screen by using an image processing algorithm.

10. The LCD panel as claimed in claim 8, wherein the source driver comprises a voltage dividing unit, and the voltage dividing unit comprises a plurality of voltage dividing resistors;
after the timing controller controls the gamma voltage generation module to output a symmetric gamma voltage to the source driver, the voltage dividing unit divides the symmetric gamma voltage to obtain a first number of symmetry divided voltages.

11. The LCD panel as claimed in claim 10, wherein the voltage dividing unit is also used in:
after the timing controller controls the gamma voltage generation module to output an asymmetric gamma voltage to the source driver, dividing the asymmetric gamma voltage to obtain a first number of asymmetric divided voltages.

12. The LCD panel as claimed in claim 10, wherein the source driver further comprises a frame rate conversion unit, the frame rate conversion unit processes the symmetric divided voltage to obtain a second number of the symmetric data line voltages, and the second number is greater than the first number.

13. The LCD panel as claimed in claim 12, wherein the number of symmetric gamma voltages is 2N, and the 2N symmetric gamma voltages are sequentially arranged from high to low or low to high; the first voltage difference of the symmetric gamma voltage is equal to the second voltage difference, the first voltage difference is a difference between a first voltage value and an Nth voltage value of the symmetric gamma voltages, and the second voltage difference is a difference between an (N+1)th voltage value and an (2N)th voltage value of the symmetric gamma voltages, the N is a positive integer greater than one.

14. The LCD panel as claimed in claim 8, wherein the gamma voltage generation module comprises a programmable gamma correction buffer circuit chip.

* * * * *